US007178166B1

(12) United States Patent
Taylor et al.

(10) Patent No.: US 7,178,166 B1
(45) Date of Patent: Feb. 13, 2007

(54) VULNERABILITY ASSESSMENT AND AUTHENTICATION OF A COMPUTER BY A LOCAL SCANNER

(75) Inventors: Patrick Taylor, Atlanta, GA (US); Scott Mewett, Holloways Beach (AU); Philip C. Brass, Roswell, GA (US); Theodore R. Doty, Roswell, GA (US)

(73) Assignee: Internet Security Systems, Inc., Atlanta, GA (US)

( * ) Notice: Subject to any disclaimer, the term of this patent is extended or adjusted under 35 U.S.C. 154(b) by 697 days.

(21) Appl. No.: 09/665,018

(22) Filed: Sep. 19, 2000

(51) Int. Cl.
*G06F 11/00* (2006.01)
(52) U.S. Cl. .............................. 726/25; 726/23; 726/24; 726/27; 726/22; 709/229; 709/228; 713/182; 713/183
(58) Field of Classification Search ................. 713/201, 713/200, 202; 709/203, 219, 229; 726/25
See application file for complete search history.

(56) References Cited

U.S. PATENT DOCUMENTS

| 4,223,380 A | 9/1980 | Antonaccio et al. |
|---|---|---|
| 4,400,769 A | 8/1983 | Kaneda et al. |
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |

(Continued)

FOREIGN PATENT DOCUMENTS

EP 0 636 977 5/2001

(Continued)

OTHER PUBLICATIONS

Gary McGraw, Edward Felten, "Secure Computing with Java: Now and the Future", 1997, "http://java.sun.com/security/javaone97-whitepaper.html"; pp. 1-20.*

(Continued)

*Primary Examiner*—Nasser Moazzami
*Assistant Examiner*—Carl Colin
(74) *Attorney, Agent, or Firm*—King & Spalding LLP

(57) ABSTRACT

Providing a user with assurance that a computer is secure based on a vulnerability assessment completed by a browser-compatible scanner operating on the computer. If the scanner finds a vulnerability, the scanner can inform the user that the machine is or may be compromised, or repair the vulnerability. For example, the scanner may be able to repair the vulnerability of the workstation. In the alternative, the scanner can provide the scan results to a network server. If the vulnerability assessment shows that the workstation is compromised, or if the possibility of remote compromise is high, the network server can decline to provide network services to the workstation.

18 Claims, 3 Drawing Sheets

U.S. PATENT DOCUMENTS

| | | |
|---|---|---|
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A * | 2/1999 | Dykes et al. ............ 726/5 |
| 5,872,978 A | 2/1999 | Hoskins |
| 5,875,296 A * | 2/1999 | Shi et al. ............ 726/5 |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,907,834 A | 5/1999 | Kephart et al. |
| 5,919,257 A * | 7/1999 | Trostle ............ 726/22 |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A * | 3/2000 | Harsham et al. ............ 709/220 |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A * | 7/2000 | Hill et al. ............ 726/25 |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 * | 8/2001 | Bond et al. ............ 726/23 |
| 6,275,942 B1 | 8/2001 | Bernhard et al. |
| 6,278,886 B1 | 8/2001 | Hwang |
| 6,279,113 B1 | 8/2001 | Vaidya |
| 6,282,546 B1 | 8/2001 | Gleichauf et al. |
| 6,298,445 B1 * | 10/2001 | Shostack et al. ............ 726/25 |
| 6,301,668 B1 * | 10/2001 | Gleichauf et al. ............ 726/25 |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah |
| 6,324,656 B1 | 11/2001 | Gleichauf et al. |
| 6,338,141 B1 | 1/2002 | Wells |

| | | |
|---|---|---|
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 * | 5/2002 | Johnson et al. ............ 709/203 |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,418,472 B1 * | 7/2002 | Mi et al. ................... 709/229 |
| 6,429,952 B1 * | 8/2002 | Olbricht .................... 358/442 |
| 6,434,615 B1 * | 8/2002 | Dinh et al. ................. 709/224 |
| 6,438,600 B1 * | 8/2002 | Greenfield et al. ......... 709/229 |
| 6,445,822 B1 | 9/2002 | Crill et al. |
| 6,453,345 B2 | 9/2002 | Trcka et al. |
| 6,453,346 B1 | 9/2002 | Garg et al. |
| 6,460,141 B1 | 10/2002 | Olden |
| 6,463,426 B1 | 10/2002 | Lipson et al. |
| 6,470,449 B1 | 10/2002 | Blandford |
| 6,477,585 B1 | 11/2002 | Cohen et al. |
| 6,477,648 B1 | 11/2002 | Schell et al. |
| 6,477,651 B1 | 11/2002 | Teal |
| 6,484,203 B1 | 11/2002 | Porras et al. |
| 6,487,666 B1 | 11/2002 | Shanklin et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 * | 6/2003 | Hummel et al. .............. 705/59 |
| 6,601,190 B1 | 7/2003 | Meyer et al. |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,816,973 B1 | 11/2004 | Gleichauf et al. |
| 6,829,711 B1 * | 12/2004 | Kwok et al. ................. 713/183 |
| 6,839,850 B1 | 1/2005 | Campbell et al. |
| 6,850,915 B1 * | 2/2005 | Wiehler ........................ 705/57 |
| 2001/0034847 A1 * | 10/2001 | Gaul, Jr. ..................... 713/201 |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |

FOREIGN PATENT DOCUMENTS

| | | |
|---|---|---|
| EP | 0 985 995 | 8/2003 |
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/054458 | 9/2000 |
| WO | WO 00/54458 | 9/2000 |
| WO | WO 01/084285 | 11/2001 |
| WO | WO 01/84285 | 11/2001 |
| WO | WO 02/06928 | 1/2002 |
| WO | WO 02/006928 | 1/2002 |
| WO | WO 02/056152 | 7/2002 |
| WO | WO 02/101516 | 12/2002 |

OTHER PUBLICATIONS

Essex, David, E-Sleuths Make Net Safe for E-Commerce, Computerworld, Jun. 2000, pp. 1-2.

Newman, David, Intrusion Detection Systems, Data Communications, 1998, pp. 1-9.

International Search Report for PCT/US02/17161 of Dec. 31, 2002.

Hyland, et al., Concentric Supervision of Security Applications: A New Security Management Paradigm Computer Security Applications Conference, 1998, pp. 59-68.

Koilpillai et al., Recon-A Tool for Incident Detection, Tracking and Response, Darpa Information Survivability Conference and Exposition, 2000, pp. 199-206.

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989of Sep. 19, 2002.

International Search Report for PCT/US02/02917 of Aug. 8, 2002.

International Search Report for PCT/US03/00155 of May 15, 2003.

NXI Communications, Inc., White Paper, NTS Security Issues, Oct. 15, 2001, pp .1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washing, DC, Oct. 1-4, 1990, pp. 827-839.

Dawson, Intrusion Protection for Networks, Byte, Apr. 1995, pp. 171-172.

Bukhan, Checkpoint Charlie, PC Week Network, Nov. 27, 1995, pp. N1, N6-N7.

Process Software Technical Support Page, found on http://www.process.com/techsupport/whitesec.html, printed off of the Process Software website on Feb. 26, 2003, pp. 1-5.

Ganesan, BAfirewall: A Modern Firewall Design, Proceedings Internet Society Symposium on Network and Distributed System Security 1994, Internet Soc., 1994, pp. 99-108.

Lee, Trusted Systems, Chapter II-1-6 of Handbook of Information Security Management, Ed. Zella G. Ruthberg and Harold F. Tipton, Auerbach, Boston and New York, 1993, pp. 345-362.

Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.

Guha et al., Network Security via Reverse Engineering of TCP Code: Vulnerability Analysis and Proposed Solution, IEEE, Mar. 1996, pp. 603-610.

Garg et al., High Level Commnunication Primitives for Concurrent Systems, IEEE, 1988, pp. 92-99.

Hastings et al., TCP/IP Spoofing Fundamentals, IEEE, May 1996, pp. 218-224.

Snapp, Signature Analysis and Communication Issues in a Distributed Intrusion Detection System, Master Thesis, University of California, Davis, California, 1991, pp. 1-40.

Guha et al., Network Security via Reverse Engineering of TCP Code: Vulnerability Analysis and Proposed Solutions, IEEE, Jul. 1997, pp. 40-48.

Djahandari et al., An MBone for an Application Gateway Firewall, IEEE, Nov. 1997, pp. 72-81.

Kim et al., Implementing a Secure Login Environment: A Case Study of Using a Secure Network Layer Protocol, Department of Computer Science, University of Alabama, Jun. 1995, pp. 1-9.

Satyanarayanan, Integrating Security in a Large Distributed System, Acm Transaction on Computer Systems, vol. 7, No. 3, Aug. 1989, pp. 47-280.

Sammons, Nathaniel, "Multi-platform Interrogation and Reporting with Rscan," The Ninth Systems Administration Conference, LISA 1995, Monterrey, California, Sep. 17-22, 1995, pp. 75-87.

Dean et al., "Java Security: From HotJava to Netscape and Beyond," Proceedings of the 1996 IEEE Symposium on Security and Privacy, May 6-8, 1996, Oakland, California, pp. 190-200.

Fisch et al., "The Design of an Audit Trail Analysis Tool," Proceedings of the 10th Annual Computer Security Applications Conference, Dec. 5-9, 1994, Orlando, Florida, pp. 126-132.

Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.

Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.

Casella, Karen A., "Security Administration in an Open Networking Environment," The Ninth Systems Administration Conference, LISA 1995, Monterrey, California, Sep. 17-22, 1995, pp. 67-73.

Burchell, Jonathan, "Vi-SPY: Universal NIM?" Virus Bulletin, Jan. 1995, pp. 20-22.

Benzel et al., "Identification of Subjects and Objects in a Trusted Extensible Client Server Architecture," 18th National Information Systems Security Conference, Oct. 10-13, 1995, Baltimore, Maryland, pp. 83-99.

Epstein et al., "Component Architectures for Trusted Netware," 18th National Information Systems Security Conference, Oct. 10-13, 1995, Baltimore, Maryland, pp. 455-463.

Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and An Early Prototype," 14th National Computer Security Conference, Oct. 1-4, 1991, Washington, DC, pp. 167-176.

Broner et al., "IntelligentI/O Rule-Based Input/Output Processing for Operating Systems," Operating Systems Review, vol. 25, No. 3, Jul. 1991, pp. 10-26.

Drews et al., "Special Delivery—Automatic Software Distribution Can Make You A Hero," Network Computing, Aug. 1, 1994, pp. 80, 82-86, 89, 91-95.

Morrissey, Peter, "Walls," Network Computing, Feb. 15, 1996, pp. 55-59, 65-67.

Harlander, Dr. Magnus, "Central System Administration in a Heterogenous Unix Environment: GeNUAdmin," Proceedings of the Eighth Systems Administration Conference (LISA VIII), Sep. 19-23, 1994, San Diego, California, pp. 1-8.

Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.

Anderson, Paul, "Towards a High-Level Machine-Configuration System," Proceedings of the Eighth Systems Administration Conference (LISA VIII), Sep. 19-23, 1994, San Diego, California, pp. 19-26.

Cooper, Michael A., "Overhauling Rdist for the '90s," Proceedings of the Sixth Systems Administration Conference (LISA VI), Oct. 19-23, 1992, Long Beach, California, pp. 175-188.

Vangala et al., "Software Distribution and Management in a Networked Environment," Proceedings of the Sixth Systems Administration Conference, Oct. 19-23, 1992, Long Beach, California, pp. 163-170.

Kim et al., "The Design and Implementation of Tripwire: A File System Integrity Checker," 2nd ACM Conference on Computer and Communications Security, Nov. 2-4, 1994, Fairfax, Virginia, pp. 18-29.

Winn Schwartau, "e.Security™-Solving 'Dumb Days' With Security Visualization," e-Security, Inc., Naples, FL 34103, 2000.

Anita D'Amico, Ph.D., "Assessment of Open e-Security Platform™: Vendor-Independent Central Management of Computer Security Resources," Applied Visions, Inc., 1999.

"e.Security™-Open Enterprise Security Management: Delivering an integrated, automated, centrally Managed Solution You Can Leverage Today and Tomorrow," e-Security, Inc., Naples, FL 34102, 1999.

"e.Security ™-Vision," e-Security, Inc., Naples, FL, 1999.

"e.Security™ -Administrator Workbench™," e-Security, Inc. Naples, FL, 1999.

"e.Security™-Fact Sheet," e-Security, Inc., Naples, FL, 1999.

"e.Security™-Open e-Security Platform™," e-Security, Inc. Naples, FL,1999.

Babcock, "E-Security Tackles The Enterprise," Jul. 28, 1999; *Inter@ctive* Week, www.Zdnet.com.

Kay Blough, "In Search of More-Secure Extranets," Nov. 1, 1999, www.InformationWeek.com.

Paul H. Desmond, "Making Sense of Your Security Tools," Software Magazine and Wiesner Publishing, www.softwaremag.com, 1999.

Kay Blough, "Extra Steps Can Protect Extranets," Nov. 1, 1999, www. InformationWeek.com.

Sean Hao, "Software protects e-commerce—e-security's product alerts networks when hackers attack," Florida Today, Florida.

Scott Weiss, "Security Strategies—E-Security, Inc.," product brief, Hurwitz Group, Inc., Mar. 24, 2000.

Sean Adee, CISA, "Managed Risk, Enhanced Response -The Positive Impact of Real-Time Security Awareness," Information Systems Control Journal, vol. 2, 2000.

"Reprint Review—The Information Security Portal—Open e-Security Platform Version 1.0", Feb. 2000, West Cost Publishing, SC Magazine, 1999.

"e.Security—Introducing the First Integrated, Automated, and Centralized Enterprise Security Management System," white paper, e-Security, Inc., Naples, FL 34102, 1999.

Ann Harrison, "Computerworld—Integrated Security Helps Zap Bugs," Feb. 21, 2000, Computerworld, vol. 34, No. 8, Framingham, MA.

Shruti Daté, "Justice Department Will Centrally Monitor Its Systems For Intrusions," Apr. 3, 2000, Post-Newsweek Business Information, Inc., www.gcn.com.

e.Security™, website pages (pp. 1-83), www.esecurityinc.com, e-Security, Inc., Naples FL 34103, Sep. 14, 2000.

Peter Sommer, "Intrusion Detection Systems as Evidence," Computer Security Research Centre, United Kingdom.

Musman et al., System or Security Managers Adaptive Response Tool, DARPA Information Survivability Conference and Exposition, Jan. 25, 2000, pp. 56-68.

Gibson Research Corporation Web Pages, Shields Up!—Internet Connection Security Analysis, grc.com/default.htm, Laguna Hills, California, 2000.

Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.

Hammer, An Intelligent Flight-Management Aid for Procedure Execution, IEEE Transactions on Systems, Man and Cybernetics, vol. SMC-4, No. 6, Nov./Dec. 1984, pp. 885-888.

Mann et al., Analysis of User Procedural Compliance in Controlling a Simulated Process, IEEE Transactions on Systems, Man, and Cybernetics, vol. SMC-16, No. 4, Jul./Aug. 1986.

Todd, Signed and Delivered: An Introduction to Security and Authentication, Find Out How the Jave Security API Can Help you Secure your Code, Javaworld, Web Publishing, Inc., San Francisco, Dec. 1, 1998, pp. 1-5.

Arvind, Secure This. Inform, Association for Information and Image Management, Silver Spring, Sep./Oct. 1999, pp. 1-4.

Stevens TCP/IP Illustrated, vol. 1, 1994, pp. 247.

Lee et al., A Generic Virus Detection Agent on the Internet, IEEE, 30th Annual Hawaii International Conference on System Sciences, 1997, vol. 4.

Cutler, Inside Windows NT, 1993, Microsoft Press.

Duncan, Advances MS-Dos, 1986, Microsoft Press.

McDaniel, IBM Dictionary of Computing, 1994, International Business Machines Corporation.

Burd, Systems Architecture, 1998, Course Technology, Second Edition.

Programmer's Guide PowerJ, 1997, Sybase.

Swimmer et al., Dynamic detection and classification of computer viruses using general behavior patterns, 1995, Proceedings of the Fifth International Virus Bulletin Conference, Boston.

Advanced Virus Detection Technology for the Next Millennium, Aug. 1999, Network Associates, A Network Associates Executive White Paper, pp. 1-14.

Enterprise-Grade Anti-Virus Automation in the 21st Century, Jun. 2000, Symantec, Technology Brief, pp. 1-17.

Kephart et al., Blueprint for a Computer Immune System, 1997, Retrieved from Internet, URL: http//www.research.ibm.com/antivirus/scipapers/kephart/VB97, pp. 1-15.

Richardson, Enterprise Antivirus Software, Feb. 2000, Retrieved from Internet, URL: http://www.networkmagazine.com/article/nmg20000426S0006, pp. 1-6.

Understanding and Managing Polymorphic Viruses, 1996, Symantec, The Symantec Enterprise Papers, vol. XXX, pp. 1-13.

Gong, JavaTM Security Architecture (JDK1.2), Oct. 2, 1998, Sun Microsystems, Inc., Version 1.0, pp. i-iv, 1-62.

Softworks Limited VBVM Whitepaper, Nov. 3, 1998, Retrieved from the Internet, URL: http://web.archive.org/web/19981203105455/http://softworksltd.com/vbvm.html, pp. 1-4.

Kephart, A Biologically Inspired Immune System for Computers, 1994, Artificial Life IV, pp. 130-139.

International Search Report for PCT/US01/26804 of Mar. 21, 2002.

Kosoresow et al., Intrusion Detection via System Call Traces, IEEE Software, pp. 35-42, Sep./Oct. 1997.

Veldman, Heuristic Anti-Virus Technology, Proceedings, 3rd International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.

Nachenberg, A New Technique for Detecting Polymorphic Computer Viruses, A thesis submitted in partial satisfaction of the requirements for the degree Master of Science in Computer Science, University of California Los Angeles, pp. 1-127, 1995.

Microsoft P-Code Technology, http://msdn.microsoft.com/archive/default.asp?url=/archive/enus/dnarvc/html/mdsn_c7pcode2.asp, pp. 1-6, Apr. 1992.

DJGPP COFF Spec, http://delorie.com/digpp/doc/coff/, pp. 1-15, Oct. 1996.

Natvig, Sandbox Technology Inside AV Scanners, Virus Bulletin Conference, Sep. 2001, pp. 475-488.

Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.

International Search Report for PCT/US01/19142 of Jan. 17, 2003.

Using the CamNet BBS FAQ, http://www.cam.net.uk/manuals/bbsfaq/bbsfaq.htm, Jan. 17, 1997.

Express Storehouse Ordering System, "Accessing ESOS through the Network", http://www-bfs.ucsd.edu/mss/esos/man3.htm, Sep. 3, 1996.

NASIRE, NASIRC Bulletin #94-10, http://cs-www.ncsl.nist.gov/secalert/nasa/nasa9410.txt, Mar. 29, 1994.

Packages in the net directory, http://linux4u.jinr.ru/usoft/WWW/www_debian.org/FTP/net.html, Mar. 20, 1997.

Sundaram, An Introduction to Intrusion Detection, Copyright 1996, published at www.acm.org/crossroads/xrds2-4/intrus.html, pp. 1-12.

Samfat, IDAMN: An Intrusion Detection Architecture for Mobile Networks, IEEE Journal on Selected Areas in Communications, vol. 15, No. 7, Sep. 1997, pp. 1373-1380.

INFO: Visual Basic Supports P-Code and Native Code Compilation (Q229415), http://support.micorsoft.com/support/kb/articles/Q229/4/15.ASP, pp. 1-2, Apr. 28, 1999.

International Search Report for PCT/US99/29117 of May 2, 2000.

Nordin, U of MN OIT Security and Assurance, Feb. 9, 2000.

Internet Security Systems, RealSecure SiteProtector, SAFEsuite Decisions to SiteProtector Migration, Aug. 8, 2003, pp. 1-42.

Internet Security Systems, SAFEsuite Enterprise, SAFEsuite Decisions, 1998.

Internet Security Systems, SAFEsuite Enterprise, Recognizing the Need for Enterprise Security: An Introduction to SAFEsuite Decisions, Aug. 1998, pp. 1-9.

Internet Security Systems, SAFEsuite Decisions 2.6, Frequently Asked Questions, Feb. 21, 2001, pp. 1-10.

Internet Security Systems, SAFEsuite Decisions Version 1.0, User's Guide, 1998, pp. 1-78.

Porras et al., Emerald: Event Monitoring Enabling Responses to Anomalous Live Disturbances, Computer Science Laboratory, SRI International, Menlo Park, CA, Oct. 1997, pp. 353-365.

Cisco Systems, Empowering the Internet Generation, 1998.

Messmer, Start-Up Puts Hackers on BlackICE, Network World Fusion, http://www.nwfusion.com/cgi-bin/mailto/x/cgi, Apr. 21, 1999, p. 1-2.

NeworkICE Corporation, Can You Explain How Your Product Can Protect a Remote User with a VPN Client?, 1998-1999, pp. 1-2, http://www.webarchive.org/web/20000304071415/advice. networkice.com/advice/support/kb/q000003/default.

Yasin, Start-Up Puts Network Intruders on Ice, http://www.internetweek.com/story/INW19990505S0001, May 5, 1999, pp. 1-2.

Morency, NetworkWorldFusion, http://nwfusion.com/cgi-bin/mailto/x.cgi, Jun. 28, 1999, pp. 1-2.

Rogers, Network ICE Touts Security Wares, Apr. 23, 1999, San Mateo, California, http://www.crn.com/showArticle.jhtml?articleID=18829106&flatPage=true, pp. 1-2.

Rogers, Network ICE Signs Resellers, May 26, 1999, San Mateo, California, http://www.crn.com/showArticle.jhtml?articleID=18805302&flatPage=true, pp. 1-2.

Internet Security Systems, I've Beem Attacked! Now What?, Aug. 27, 1999, http://www.iss.net/security_center/advice/Support/KB/q000033/default.htm, pp. 1-2.

Internet Security Systems, What is the Format of "Attack-List. CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998, http://www.sdl.sri.com/projects/emerald/livetraffic.html, pp. 1-16.

Raynaud et al., Integrated Network Management IV, 1995, Proceedings of the 4th International Symposium on Integrated Network Management, pp. 1-2, and 5-16.

Heberlein, et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmK1m2QoJ:www.veritas.com/us/aboutus/pressroom/199....

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetail.jsp?type=Financial&oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

Internet Security Systems, Inc., SAFEsuite Decisions User Guide, Version 1.0, 1998, pp. 1-78.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES-A Real Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

Porras et al., Penetration State Transition Analysis A Rule-Based Intrusion Detection Approach, 1992, pp. 220-229.
Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection System, 1988.
Snapp, Steven Ray, Signature Analysis and Communication Issues in a Distributed Intrusion Detection System, 1991, pp. 1-40.
Porras et al., EMERALD: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype for Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Piece of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
EMERALD TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery: An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.byte.com/art/9805/sec20/art1.htm, May 1998, pp. 1-8.
Cisco Systems, Inc., Newtork RS: Intrusion Detection and Scanning with Active Audit Session 1305, 1998.
Business Security Advisor Magazine, Intrusion Detection Systems: What You Need to Know, http://advisor.com/doc/0527, Sep. 1998, pp. 1-7.

Garvey et al., An Inference Technique for Integrating Knowledge from Disparate Sources, Multisensor Integration and Fusion for Intelligenct Machines and Systems, 1995, pp. 458-464.
Power et al., CSI Intrusion Detection System Resource, Jul. 1998, pp. 1-7.
Cisco Systems, Inc., NetRanger User's Guide Version 2.1.1, 1998.
Internet Security Systems, Real-Time Attack Recognition and Response: A Solution for Tightening Network Security, http://www.iss.net, 1997, pp. 1-13.
Network ICE Corporation, Network ICE Product Documentation, pp. 1-3, http://www.web.archive.org/web/20011005080013/www.networkice.com/support/documentation.html, Jul. 6, 2004.
Network ICE Corporation, Network ICE Documentation, p. 1, http://www.web.archive.org/web/19991109050852/www.networkice.com/support/docs.htm, Jul. 6, 2004.
Network ICE Corporation, Network ICE Press Releases, p. 1, http://www.web.archive.org/web/19990903214428/www.netice.com/company/pressrelease/press.htm, Jul. 7, 2004.
Network ICE Corporation, Network ICE Press Releases, p. 1, http://www.web.archive.org/web/20000304074934/www.netice.com/company/pressrelease/press.htm, Jul. 7, 2004.
Brentano et al., An Architecture for Distributed Intrusion Detection System, Department of Energy Computer Security Group, 14th Annual Conference Proceedings, pp. (17)25-17(45), May 1991.
Staniford-Chen et al., GrIDS-A Graph Based Intrusion Detection System for Large Networks, University of California, Davis, California, 19th National Information Systems Security Conference, 1996, pp. 1-10.
Ricciulli et al., Modeling Correlated Alarms in Network Management Systems, SRI International, Menlo Park, California, , Proceedings of the Conference on Communication Networks and Distributed System Modeling and Simulation, 1997, pp. 1-8.
Porras et al., Emerald: Event Monitoring Enabling Responses to Anomalous Live Disturbances, SRI International, Menlo Park, California, 20th National Information Systems Security Conference, Oct. 1997, pp. 1-24.
Porras et al., A Mission-Impact Based Approach to INFOSEC Alarm Correlation, SRI International, Menlo Park, California, Oct. 2002, pp. 1-33.
Phrack 55 Download (234 kb, Sep. 9, 1999), http://www.phrack.org/show.php?p=55&a=9, pp. 1-6.
Porras et al., A Mission-Impact-Based Approach to INFOSEC Alarm Correlation, SRI International, Menlo Park, California, Oct. 2002, pp. 1-19.
Bace, An Introduction to Intrusion Detection and Assessment for System and Network Security Management, 1999, pp. 1-38.
Hunteman, Automated Information System—(AIS) Alarm System, University of California, Los Alamos National Laboratory, 20th National Information System Security Conference, Oct. 1997, pp. 1-12.
Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.
Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=infosecprodsservices/b...
Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.
Lunt et al., Knowledge-Based Intrusion Detection, SRI International, Menlo Park, California, Conference on AI Systems in Government, Washington, D.C., Mar. 1989, pp. 102-107.
A. Information Assurance BAA 98-34 Cover Sheet, SRI International, Nov. 1, 2000, pp. 2-35.
NetScreen Products, FAQ, http://www.netscreen.com/products/faq.html, Feb. 28, 2003, pp. 1-6.
Miller, A Network Under Attack: Leverage Your Existing Instrumentation to Recognize and Respond to Hacker Attacks, NetScout Systems, Westford, MA, Apr. 2003, pp. 1-8.
Technology Brief: Intrusion Detection for the Millennium, Internet Security Systems, 2000, pp. 1-6.

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.

Snapp et al., DIDS (Distributed Intrusion Detection System)—Motivation, Architecture, and an Early Protype), University of California, Davis California, , Proc. 14th National Computer Security Conference, Washington, D.C., Oct. 1991, pp. 167-176.

Internet Security Systems, Inc., SAFEsuite Enterprise Edition, Project "Gatekeeper" 1.0, Market Requirements Document, Mar. 30, 1998, pp. 1-12.

Internet Security Systems, SAFEsuite Decisions, 2000, pp. 1-2.

Internet Security Systems, Dynamic Threat Protection, Presse-Roundtable, Munich, Germany, Apr. 10, 2003, pp. 1-63.

Internet Security Systems, Preliminary ODM 1.0 Functional Specification, Aug. 1997, pp. 1-7.

Internet Security Systems, Inc., Scanner-ISSDK Interface, Design Specification, Jun. 2, 2000, Draft 1.07, pp. 1-7.

RealSecure, Adaptive Network Security Manager Module Programmer's Reference Manual, pp. 1-74.

Advanced Concept Technology Demonstrations (ACTD), 2005, pp. 1-28.

Frank, Sounding the Alarm, Sep. 6, 1999, Federal Computer Week, pp. 1-2.

Crumb, Intrusion Detection Systems to be Integrated at AFRL, Air Force Research Laboratory, News@AFRL, Fall 1999, pp. 1.

Temin, Case Study: The IA: AIDE System at Two, 15th Annual Computer Security Applications Conference, Dec. 6-10, 1999, Phoenix, Arizona, pp. 1-26.

Spink, Automated Intrusion Detection Environment (AIDE), Intrusion Detection Sensor Fusion, Sep. 7, 1999, pp. 1-25.

Frincke et al., A Framework for Cooperative Intrusion Detection, 21st National Information Systems Security Conference, Oct. 6-9, 1998, Crystal City, Virginia, pp. 1-20.

Anderson et al., In Athena's Camp: Preparing for Conflict in the Information Age, An Exploration of Cyberspace Security R&D Investment Strategies for DARPA: The Day After-in Cyberspace II, Chaper Eleven, 1996, pp. 253-271.

Valdes et al., SRI International, Probabilistic Alert Correlation, 2001, pp. 1-15.

Bass, Multisensor Data Fusion for Next Generation Distributed Intrusion Detection Systems, Apr. 28, 1999, Iris National Symposium, pp. 1-6.

Perrochon et al., Enlisting Event Patterns for Cyber Battlefield Awareness, No Date, Stanford University, pp. 1-12.

Perrochon, Using Context-Based Correlation in Network Operations and Management, Jul. 2, 1999, Stanford University, pp. 1-20.

Perrochon, Real Time Event Based Analysis of Complex Systems, Jun. 1998, pp. 1-9.

Luckham et al., Complex Event Processing in Distributed Systems, Aug. 18, 1988, Stanford University, pp. 1-26.

Pettigrew, US Southcom United States Southern Command's Information Sharing Projects, Summer 1999, IAnewsletter, vol. 3, No. 1, pp. 1-24.

Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.

Cheung et al., The Design of GrIDS: A Graph-Based Intrusion Detection System, Jan. 26, 1999, University of California, pp. 1-51.

Cohen et al., Report of the Reporting and Analysis Track, Detection of Malicious Code, Intrusions, and Anomalous Activities Workshop, Feb. 22-23, 1999, pp. 1-47.

Garofalakis et al., Network Mining and Analysis: The Nemesis Project, Bell Labs, Lucent Technologies, No Date, pp. 1-12.

RealSecure ICEcap Manager User Guide Version 3.6, Internet Security Systems, Inc., 1998-2002, pp. 1-228.

Cuppens, Cooperative Intrusion Detection, Date Unknown, pp. 1-10.

Mukherjee et al., Network Intrusion Detection, IEEE Network, May/Jun. 1994, pp. 26-41.

Machlis, Net Monitoring Tools Gain Real-Time Alerts, Apr. 14, 1997, http://www.computerworld.com, pp. 1-12.

Omniguard/ITA Intruder Alert, AXENT Technologies, Inc., Nov. 17, 2004, http://www.web.archive.org, pp. 1-10.

NetRanger Overview, Chapter 1, Date Unknown, pp. 1-16.

Sutterfield, Large-Scale Network Intrusion Detection, 1997, WheelGroup Corporation, pp. 1-10.

Kumar et al., An Application of Pattern Matching in Intrusion Detection, Technical Report No. CSD-TR-94-013, Jun. 17, 1994, Purdue University, pp. 1-55.

Huang et al., A Large-Scale Distributed Intrusion Detection Framework Based on Attack Strategy Analysis, Date Unknown, The Boeing Company, pp. 1-12.

Perrochon et al., Event Mining with Event Processing Networks, Date Unknown, Stanford University, pp. 1-4.

Gruschke, Integrated Event Management: Event Correlation Using Dependency Graphs, presented at DSOM 1998, University of Munich, pp. 1-12.

Bass, Intrusion Detection System and Multisensor Data Fusion, Apr. 2000, Communications of the ACM, vol. 43, No. 4, pp. 99-105.

Bass et al., A Glimpse into the Future of ID, Date Unknown, Usenix, pp. 1-10.

LaPadula, State of the Art in Anomaly Detection and Reaction, Jul. 1999, Mitre Corporation, pp. 1-36.

Rationalizing Security Events with Three Dimensions of Correlation, Date Unknown, NetForensics, Tech Brief, pp. 1-6.

Jou et al., Design and Implementation of a Scalable Intrusion Detection System for the Protection of Network Infrastructure, Date Unknown, MCNC, pp. 1-15.

Caldwell, Event Correlation: Security's Holy Grail?, Aug. 1, 2002, GuardedNet, pp. 1-21.

Metcalf et al., Intrusion Detection System Requirements, Sep. 2000, Mitre Corporation, pp. 1-33.

Jou et al., Architecture Design of a Scalable Intrusion Detection System for the Emerging Network Infrastructure, Technical Report CDRL A005, Apr. 1997, MCNC, pp. 1-42.

Security Manager for UNIX Systems Version 3.2.1 User's Guide, Feb. 1998, Internet Security Systems, pp. 1-62.

RealSecure Release 1.2 for UNIX A User Guide and Reference Manual, 1997, Internet Security Systems, Inc., pp. 1-92.

Internet Scanner SAFE SAFEsuite 4.0 User Guide and Reference Manual, 1996, Internet Security Systems, Inc., pp. 1-158.

Internet Scanner 3.3 User Guide and Reference Manual, 1996, Internet Security Systems, Inc., pp. 1-119.

Landwehr et al., Newsletter of the IEEE Computer Society's TC on Security and Privacy Electronics, Electronic CIPHER, Nov. 25, 1997, Issue 25, pp. 1-34.

20th National Information Systems Security Conference, Oct. 6-10, 1997, Baltimore, Maryland, pp. 1-44.

EMERALD Alert Management Interface User's Guide Version 1.2 Dec. 6, 2000, SRI International, pp. 1-11.

Anderson et al., Detecting Unusual Program Behavior Using the Statistical Component of the Next-Generation Intrusion Detection Expert System (NIDES), May 1995, SRI International, pp. 1-89.

Lunt et al., Detecting Intruders in Computer Systems, 1993 Conference on Auditing and Computer Technology, SRI International, pp. 1-17.

Network ICE Products—ICEcap, Date Unknown, pp. 1-2.

Forlanda, The Secrets to Driving on BlackICE, Jan. 12, 2000, Network ICE, pp. 1-35.

BlackICE User's Guide Version 1.0 Beta Draft, 1999, Network ICE Corporation, pp. 1-59.

ICEcap Administrator's Guide Version 1.0 Beta Draft, 1999, Network ICE Corporation, pp. 1-25.

Shulak et al., ICEcap Advanced Administration Guide Version 3.0 2001, Internet Security Systems Corporation, pp. 1-51.

"Real Secure, OS Sensor User Guide," Version 5.0, © Internet Security Systems, Inc., 199?-2000; Sep. 2000, pp. 1-64.

"Real Secure, User's Guide," Version 3.0, © 1992-1998, Internet Security Systems, Inc., pp. 1-128.

"System Security Scanner, User Guide," Version 1.6, © 1996-1998, Internet Security Systems, Inc., pp. 1-164.

"Real Secure™, Network Engine User Guide," Version 3.2.1, © 1999 by Internet Security Systems, Inc., pp. 1-38.

"Real Secure™, User Guide," Version 3.2.1, © 1999 by Internet Security Systems, Inc., pp. 1-38.
"Real Secure™, Manager for HP OpenView User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1, , © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8, © 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite DECISIONS, User Guide," Version 2.5, © 2000 by Internet Security Systems, Inc., pp. 1-194,
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host-Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently-Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.

* cited by examiner

VULNERABILITY ASSESSMENT AND AUTHENTICATION OF A COMPUTER BY A LOCAL SCANNER

RELATED APPLICATION

The present application is related to U.S. patent application Ser. No. 09/607,375, filed on Jun. 30, 2000, entitled "Method and Apparatus for Network Assessment and Authentication," which is fully incorporated herein by reference.

FIELD OF THE INVENTION

The present invention relates to network security for distributed computer systems and, more specifically, to granting computer services based upon a local vulnerability assessment of a computer by a browser-based scanner operating on that computer.

BACKGROUND OF THE INVENTION

While the open network architecture of the Internet permits a user on a network to have access to information on many different computers, it also provides access to messages generated by a user's computer and to the resources of the user's computer. In fact, there are persons who attempt to use knowledge regarding the operations of the protocol stack and operating systems in an effort to gain access to computers without authorization. These persons are typically called "hackers." hackers present a significant security risk to any computer coupled to a network where a user for one computer may attempt to gain unauthorized access to resources on another computer of the network. For example, an employee may attempt to gain access to private and confidential employee records on a computer used by the human resources department of an employer.

The present invention solves the security compromise problem by using services provided by a scanner operable with a Web-enabled browser for the invocation and execution of scans and risk assessment. The invention can accomplish this desirable objective using a browser-based tool to scan the user's workstation for evidence of a security compromise or a vulnerability.

SUMMARY OF THE INVENTION

The disadvantages of the prior art are overcome by the present invention, which can complete a local scan of a workstation upon installation of a browser-based scanner provided to the workstation by a remote server via a distributed computer network. A remote server receives a request for an on-line scanner from a browser operating on a workstation connected to a computer network. In response to receiving the scanner via the network, the browser installs the scanner at the workstation to support the completion of vulnerability assessment scans within the local operating environment of the workstation. Using this local scanner, the browser can perform a scan of the workstation and its operating environment and generate a scan results report for presentation to the user or a system administrator. The browser also can transmit the scan results to the remote server for archival storage and subsequent reporting. In one aspect of the invention, the browser can attempt to address an identified security risk by implementing a repair solution or "fix of the workstation."

In view of the foregoing, it will be understood that the present invention can deploy a scanning tool from a remote server to a browser-enabled workstation to support a local assessment of the vulnerability of a workstation coupled to a computer network. This scanning tool can operate within the browser environment to complete a scan of the workstation and to generate workstation credentials. The advantages and implementation of the present invention will be described in more detail below in connection with the detailed description, the drawing set, and the attached claims.

DETAILED DESCRIPTION OF THE EXEMPLARY EMBODIMENTS

In environments where computers are shared, users want an assurance that the computer they are accessing is secure, before completion of the log-in operation. For an exemplary embodiment, a local scanner can complete a vulnerability assessment of the workstation and provide the scan results to the user or to a system administrator. If the local scanner finds a vulnerability, a local process can inform the user that the machine is or may be compromised, or repair an identified vulnerability. The local scanner can be implemented as a plug-in or a control for operation with a browser operating on the workstation. For example, the local scanner can be implemented as an ActiveX control maintained at a Web server available for download to a workstation in response to a network request transmitted by a browser operated on the workstation. Once installed, the ActiveX control can operate in tandem with the browser to perform a vulnerability assessment of the workstation and to generate a report identifying the scanned results.

For another exemplary embodiment, the results of the local host assessment can be provided to a network server prior to the delivery of the requested network service to the workstation. For example, a local scanner operating in tandem with a browser on the workstation can complete a vulnerability assessment of the workstation and supply the scan results to the browser installed on workstation. In turn, the browser can transmit the local scan results to the network server via the computer network for evaluation by the network server. Performing a vulnerability assessment at the local level of the workstation allows a network server to determine whether the workstation is a "trusted" platform from which to accept network service requests. If the vulnerability assessment shows that the computer is compromised, or if the possibility of remote compromise is high, the network server can deny service to the workstation. Optionally, the network server can distribute a vulnerability assessment tool via the computer network to repair the vulnerability of the workstation.

Figure 1:
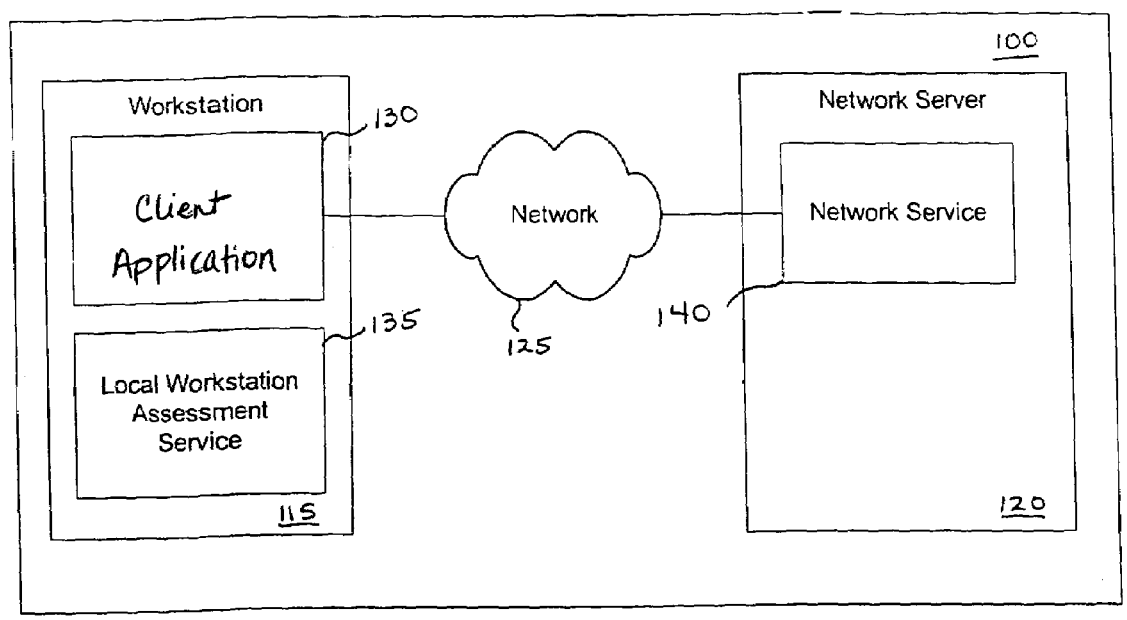
FIG. 1 is a block diagram illustrating the primary components of a network security system, including a local workstation assessment service on a workstation, in accordance with an exemplary embodiment of the present invention.

Turning now to the drawing set, in which like numbers reference like elements, FIG. 1 illustrates a client-invoked vulnerability assessment of a workstation in which the workstation credentials are generated locally at the workstation. In other words, the vulnerability assessment is invoked at the client and the assessment is completed by a local workstation assessment service on the workstation. Workstation credentials typically include information about the current integrity of the workstation and the security posture of the workstation. For example, security posture can include data that indicates the potential for the workstation to be compromised by an unauthorized user or service. As shown in FIG. 1, an exemplary network security system 100 comprises a workstation 115 operating a local workstation assessment service in a network environment including a distributed computer network 125 and a network server 120. A client application 130 retrieves workstation credentials, typically including workstation integrity information and workstation security posture information, from the local workstation assessment service 135 on the workstation 115. The local workstation assessment service 135 generates the workstation credentials by completing a local vulnerability examination of the workstation 115.

The client application 130 can present the results of the local scan assessment, namely the workstation credentials, to the user. This allows the user to compare the scan assessment results to a workstation security policy to determine the extent to which the workstation 115 complies with that security policy. In the event that the local workstation assessment service 135 detects a vulnerability, the client application 130 can present to the user the recommended course of action to repair the detected vulnerability. The client application 130 can be implemented by a browser, such as the "INTERNET EXPLORER" browser marketed by Microsoft Corporation, and the local workstation assessment service 135 can be implemented by a scanner plug-in or control for installation at the browser. For example, the local workstation assessment service 135 can be embodied by an ActiveX control available for download from the Web server for use with the browser operating on the workstation 115 to complete local scan operations. The plug-in or control operates in tandem with the browser to complete a scan of the workstation and its environment and to generate scan results.

The client application 130, which also resides on the workstation 115, can present the local scan results to a network service 140 on the network server 120. The network service 140 can store the local scan results of the server 120 to create an archival record of the vulnerability assessment of the workstation 115. The network service 140 can also decide whether to provide service to the workstation 115 via the network 125 based on workstation credentials, namely the local scan results. Specifically, the network service 140 completes this decision-making process by evaluating the workstation against a workstation security policy. This allows the network service 140 to determine the extent to which the workstation 115 complies with its security policy. The network service 140 typically uses a policy compliance measurement to decide what, if any, service level to be the supplied to the workstation 115. In the alternative, the network service 140 can transmit a vulnerability assessment tool to repair the vulnerability of the workstation 115.

Figure 2:
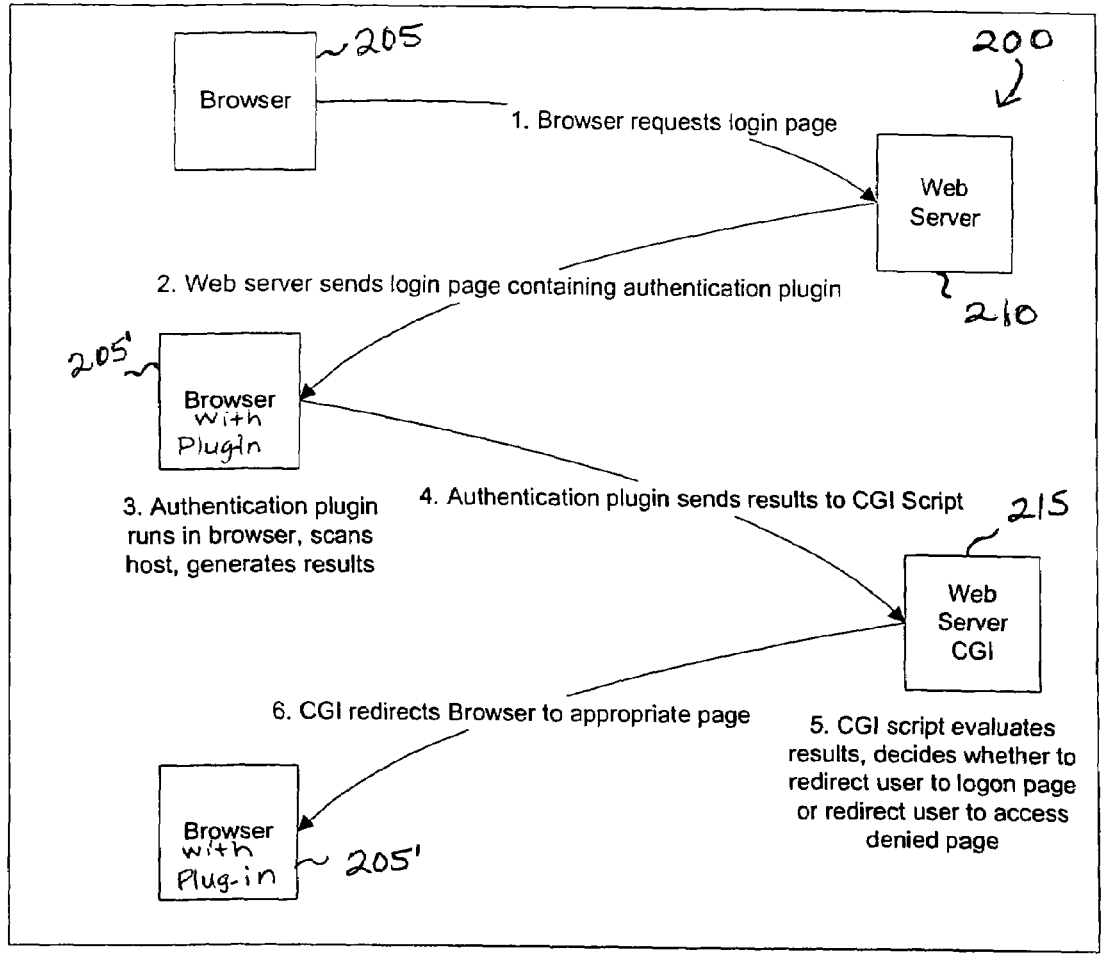
FIG. 2 is a diagram showing interactions between a browser and a Web server in a Web-based security system in accordance with an exemplary embodiment of the present invention.

An exemplary process 200 for a Web-based authentication service relying upon browser-based technology is shown in FIG. 2. Turning to FIG. 2, the process 200 is initiated by a browser 205, operating on a workstation coupled to a computer network. The browser 205 issues a request to a network server, such as a Web server 210, via a distributed computer network, such as the Internet or a corporate intranet. Responsive to the request, the Web server 210 transmits a workstation assessment agent, which may be a "JAVA" applet, ActiveX control, browser plug-in, or other Web-based executable content, to the Web browser 205 in response to the request. Once installed at the browser 205, the workstation assessment agent generates workstation credentials based on a local examination of the workstation. For example, if the workstation assessment agent is implemented as a browser plug-in, also described as an authentication plug-in, the plug-in operates within the browser environment to complete a scan of the host computer. The results of this vulnerability scan represent workstation credentials. For the representative example shown in FIG. 2, the workstation assessment agent is implemented by a browser plug-in 205'.

The workstation assessment agent, i.e., the browser plug-in 205', transmits the workstation credentials to the Web server 210 via the computer network. An application on the Web server 210, typically a CGI 215, compares the workstation credentials to a workstation security policy to decide whether the workstation is secure. Service by the Web server 210 is allowed if the CGI 215 determines that the workstation is secure and the Web server 210 authenticates the user. If the CGI 215 decides to continue, and the Web server 210 has not already authenticated the user, the server may begin the user authentication process. There is a benefit to authenticating the user after completing a vulnerability analysis of the workstation—it is more difficult for an intruder to steal a user's credentials if the intrusion is detected and the user authentication process is terminated before the user presents their credentials.

Table I provides an overview of the primary network service authentication tasks completed for the Web-based operating environment of a workstation assessment agent operating on a workstation and a Web server, as shown in FIG. 2. The workstation assessment agent completes vulnerability assessment tasks and transmits the assessment results to the Web server. In turn, the Web server determines whether to provide a network service to the workstation based on the assessment results.

TABLE I

1. The user of a workstation requests a log-in page from a Web server, typically by clicking a button or link on a Web page to begin the authentication process.
2. A browser, operating at the workstation, loads a log-in page or a host authentication page from the Web server. The host authentication page typically contains a browser plug-in representing a workstation assessment agent.
3. The browser plug-in performs a host assessment scan of the workstation.
4. The browser plug-in sends the scan results from the browser via a secure link to a CGI script on the Web server.
5. The CGI script uses the scan results to decide whether to grant the workstation access to a network service at the Web server.
6. If the workstation is granted access, the CGI script redirects the browser to the next step in the authentication process, namely user authentication. If the workstation is denied access, the CGI script redirects the browser to a page that explains to the user why the workstation cannot be granted access to the Web server. This page also describes what the user can do to bring the host into compliance so that access will be granted.

The exemplary Web-based process shown in FIG. 2 is supported by two separate components: (1) the browser plug-in 205' that performs the workstation assessment in connection with browser operations; and (2) the CGI script 215, which evaluates the workstation credentials generated by the asessment and determines whether the host satisfies authentication requirements. The browser plug-in and the CGI script are representative embodiments of software routines that operate on the workstation and the Web server, respectively. The workstation assessment service is provided by the browser plug-in and implemented by a variety of different software routines, including a Java applet or an ActiveX control. Likewise, the network service implemented by the CGI script can be implemented by other conventional Web-based executable software programs. Consequently, it will be understood that the present invention is not limited to a particular Web-based implementation, such as the representative exemplary embodiment illustrated in FIG. 2.

The workstation assessment agent, implemented as a browser plug-in 205', has three main functions: host assessment; communication of workstation assessment results; and reporting workstation assessment results. The host assessment is completed to determine whether the workstation is compromised. The browser plug-in 205' runs a series of checks or exploits, each looking for a particular security risk. Each check generates a scan result, which indicates whether a vulnerability risk is present at the workstation. The browser plug-in 205' then prepares assessment results for transmission to the Web server.

The browser plug-in 205' communicates the assessment results to the CGI script 215 operating on the Web server 210. This communication is preferably completed in a secure manner, between the workstation and the Web server, so that results cannot be intercepted by a third party. The communication also should be secure in such a way as to prevent the transmission of false information to the CGI script 215. This can be accomplished by the use of authentication or encryption technologies For example, the communication between the browser plug-in 205' and the CGI script 215 can be completed by sending an HTTPS GET request with vulnerability assessment results stored as parameters of the GET request. The browser plug-in 205' can generate a URL that uses HTTPS for confidentiality and contains the scan results as parameters. These parameters can be obfuscated by using shared secret encryption to prevent reverse engineering of the communications channel and to insure transmission only to appropriate servers.

The CGI script 215 receives scan results from a Web-enabled client and decides, based on the results, whether to continue the authentication process. The script 215 responds to the scan results by redirecting the Web client, i.e., the workstation, to one of two different Web pages based on this decision. If the script 215 decides to allow authentication to continue, it redirects the browser 205 to a page that continues or completes the log-on process. If the script 215 decides to deny access, it redirects the browser 205 to a page that explains that service is denied, why access is denied, and what can be done to obtain access to the requested service.

The CGI script 215 is preferably capable of receiving encrypted data comprising scan results from the browser plug-in 205', decrypting the data, and making a decision based on the results. The script 215 can assign a score to each different vulnerability identified by the browser plug-in 205'. When all results are received from the browser plug-in 205', the script 215 calculates a total score by adding the score assigned to each vulnerability. The total score is then compared by the script 215 against a maximum allowable score. If the total score is less than or equal to the maximum allowable score, authentication is allowed to proceed. If the total score is greater than the maximum allowable score, access by the workstation to the Web server 210 is denied by the script 215.

The Web-based design illustrated in FIG. 2 requires the server to decide, based on security assessment information from the client, whether or not to grant access, or to possibly grant restricted access to a client workstation. In the alternative, the client can make that decision, given sufficient decision-making information at the workstation or received from the server. For example, a browser operating on a workstation can issue a request for a log-in page to a network server. In response, the network server can transmit the log-in page, an authentication plug-in, and a workstation policy to the workstation via the computer network. The authentication plug-in is installable within the browser and operative to generate workstation security credentials by completing a vulnerability assessment of the workstation to identify security vulnerabilities that would compromise the secure operation of the workstation on the computer network. The workstation security credentials can be compared to the workstation policy on the workstation to determine whether the workstation should be granted access to a software service of the network.

In many web service contexts, the result of a decision-making process for determining whether to grant access by a client to a network service can be expressed as making a choice between URLs. If the decision comes out one way, the browser points to one URL. If it comes out another way, the browser points to a different URL. This can be accomplished on the server side by instructing the client to submit scan information to the server, and having the server redirect the client to the appropriate URL after making the service access decision.

In the past, a local host scanning device has typically been implemented as an installable, executable program that uses services provided by the operating system on a workstation for the completion of vulnerability assessment scans. In contrast to the prior art, the present invention operates within the environment of a browser on a workstation to complete vulnerability assessments of the workstation and its operating environment. In an alternative exemplary embodiment, a browser operating on the workstation can request a scanner from a Web server via a computer network. The Web server transmits the scanner to the browser via the computer network for installation at the local workstation, otherwise described as a client computer. The scanner is a browser-based program that can be downloaded from a remote server to a browser-compatible workstation to complete local vulnerability assessments without the use of operating system services. Upon installation at the browser, the scanner can complete vulnerability assessment operations and generate a report describing the scan results. The scan results can be presented to the user or to a system administrator responsible for resources of the computer network coupled to the workstation. The scanner also can attempt to repair an identified security risk. Vulnerability assessments and repair operations are completed within the Web-enabled browser environment.

Figure 3:
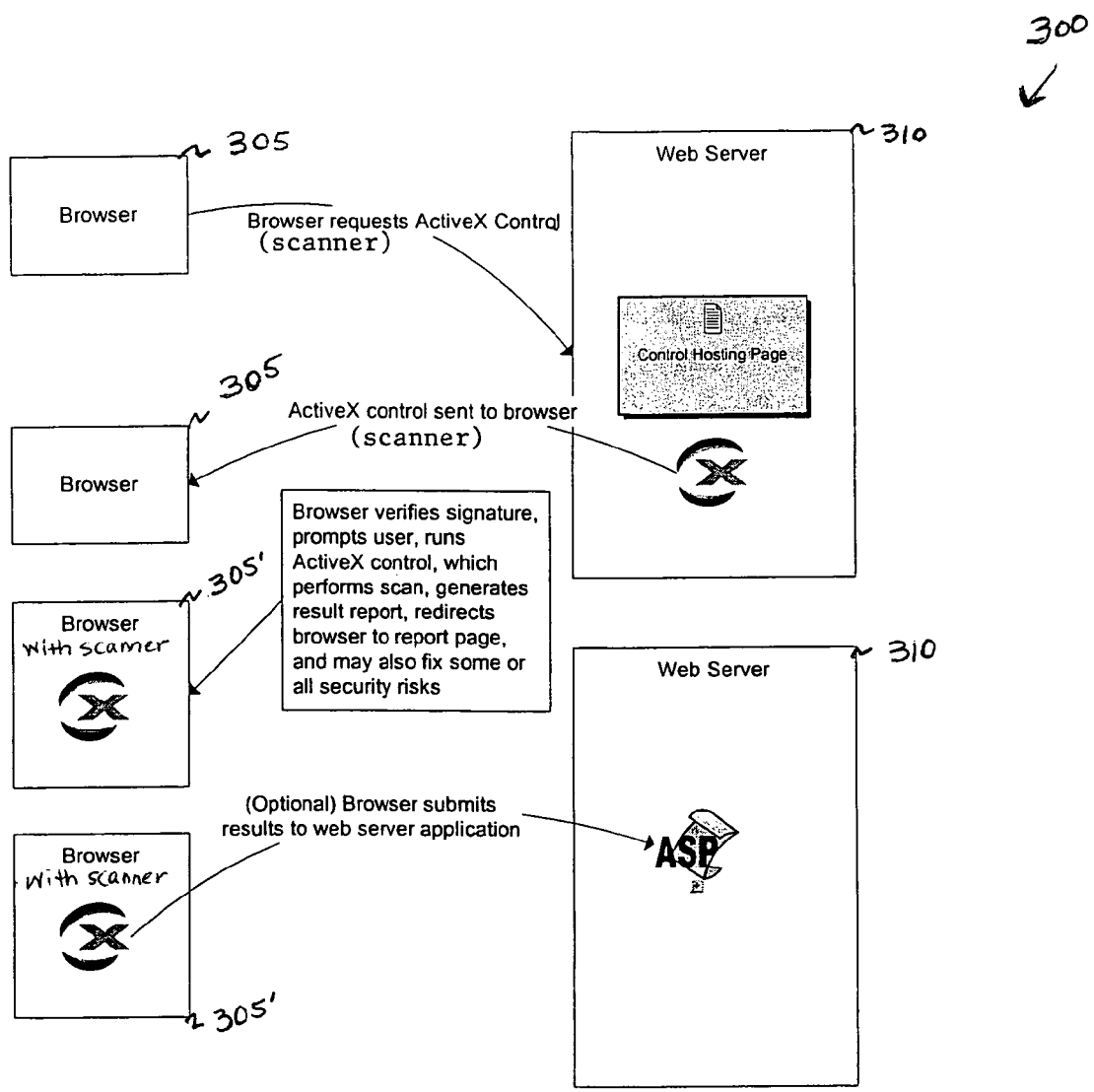
FIG. 3 is a diagram illustrating interactions between a browser and a Web server in a Web-based security system using a scanner operating within a browser environment on a workstation in accordance with an alternative exemplary embodiment of the present invention.

Turning now to FIG. 3, an exemplary browser-enabled operating environment 300 comprises a workstation with a Web-compatible browser 305 and a Web server 310, each coupled to a computer network (not shown), such as the global Internet or a corporate intranet. To initiate installation of a scanner, the browser 305 transmits a request via the computer network to a network server, such as the Web server 310. The Web server 310 typically publishes a Web page that hosts the scanner for download to a requesting workstation. For an exemplary embodiment, the scanner is packaged as an ActiveX control for operation within an ActiveX-compatible browser, such as Microsoft's "INTERNET EXPLORER" browser program. For example, the scanner can comprise an ActiveX control DLL and a data file comprising vulnerability descriptions, both packaged within a .CAB file. Alternative embodiments of the scanner can include a JAVA applet, a browser plug-in, or another Web-based executable tool.

The browser 305 can download the scanner by accessing an OBJECT tag at the control hosting page published by the Web server 310. The OBJECT tag typically comprises a class identifier (ID) for an ActiveX control and a uniform resource locator (URL) to the online scanner program (.CAB file) containing the ActiveX control. The scanner program typically includes a current version identifier for the ActiveX control. The browser 305 preferably uses the current version of the ActiveX control to support online scan operations within the browser environment of the workstation. If an ActiveX control with the specified class ID has been installed at the workstation, the browser can compare the version number for that ActiveX control to the version number specified by the OBJECT tag. If the version number in the OBJECT tag represents a more recent version of the ActiveX control, then the browser can download the current version of the ActiveX control to deploy the online scanner. If, on the other hand, the version number for the currently installed ActiveX control is the same as or less than the OBJECT tag, then the browser should not download a new copy of the ActiveX control. This functionality is supported by Microsoft's "INTERNET EXPLORER" browser and is used by the exemplary embodiment to operate an online scanner within the browser environment of the workstation based upon the current version of the appropriate ActiveX control.

In response to the deployment request, the control hosting page at the Web server 310 transmits the online scanner to the browser 305 at the workstation via the computer network. Upon completing the download operation, the browser 305 can use "Authenticode" technology to verify the identity of the publisher of the ActiveX control for the scanner and to query the user whether the scanner should be installed as part of the browser operating on the workstation. As known to those of skill in the art, Authenticode technology comprises a special signing key and the signing of either the ActiveX control or the .CAB file representing the scanner. This signing key must, in turn, be signed by a trusted third party to support a secure installation of the scanner at the browser 305. For example, Verisign can provide a code-signing key to sign the ActiveX control of the scanner program. Upon downloading the scanner, the browser 305 can query the user as to whether the user wishes to download an ActiveX control published by a publisher having an identity verified by Verisign.

Upon completion of the installation operation, the browser-compatible scanner 305' can complete vulnerability assessments of the local workstation and its operating environment. The scanner 305' can generate a report in response to completing vulnerability assessment scan operations. The scanner 305' typically presents this report to the user or to a system administrator for the computer network coupled to the workstation. For example, the scanner 305' can display the scan results as a report published in the form of a HYPERTEXT MARKUP LANGUAGE (HTML) page published at the workstation. The scanner also can transmit the results using the HTTP or HTTPS protocol to a remote server, such as the Web server 310, for archival storage and to generate subsequent reports. The scanner 305' can support this transmission of scan results via the computer network based upon a browser-supplied application programming interface (API).

For an exemplary embodiment, the scanner 305' also can attempt to repair security risks identified by the vulnerability assessment report. In the alternative, the scanner can identify a repair solution in the report presented to the user or to the system administrator. It will be understood that an optional scanner operation is the transmission of scan results via the browser 305 to another server connected to the computer network.

Significantly, the present invention supports the distribution and execution of a vulnerability assessment tool within a browser operating at a workstation coupled to a computer network. Although this online scanner is typically supported by Microsoft's ActiveX control technology, it will be understood that alternative Web technologies can be used to implement the online scanner, including Sun's "JAVA" language or other Web-deployed technologies, such as "JavaScript", VBSCript, and Macromedia's "Shockwave" technologies. Rather than install a software program for operation with the operating system of a workstation, the present invention can support a vulnerability assessment of the workstation and its operating environment via a Web-enabled browser. This enables the scanner to be installed on a central server for deployment to multiple workstations via a browser operating on each workstation.

In view of the foregoing, it will be understood that the present invention also provide a Web-based system for completing local scan assessments of a workstation in connection with the operation of a browser running on that workstation. The scanner can be downloaded to the workstation from a Web server and installed as a plug-in or control within the browser environment of the workstation. The scanner can complete a local scan of the workstation and its operating environment and generate workstation assessments results for presentation to the user or delivery to a network server.

The above-described embodiments are presented as illustrative examples. Although the preferred operating environment for the present invention is a Web-based computing environment, such as the Internet, those skilled in the art that the present invention is operable within other forms of distributed computer networks, such as local area or wide area network. It will be readily appreciated that deviations may be made from the specific embodiments disclosed in this specification without departing from the invention. Accordingly, the scope of this invention is to be determined by the claims below rather than being limited to the specifically described embodiments above.

What is claimed is:

1. A computer-implemented process for assessing the vulnerability of a workstation to a security compromise, comprising the steps:

issuing a request for a scanner from a browser operating, on the workstation to a network server via a computer network;

transmitting the scanner from the network server to the workstation via the computer network, the scanner installable within the browser and operative to complete a vulnerability assessment of the workstation to identify security vulnerabilities of the workstation that can compromise secure operation of the workstation on the computer network;

completing a repair operation by the scanner to address a security vulnerability identified by the scanner in response to completing the vulnerability assessment of the workstation;

generating workstation credentials derived from the scanner conducting the vulnerability assessment of the workstation, the workstation credentials comprising at least one of information about integrity of the workstation and a security posture of the workstation;

comparing the workstation credentials to a workstation policy;

authenticating a workstation for access to the network server by granting the workstation access to one or more services available on the network server if the workstation credentials derived from the scanner are in compliance with the workstation policy;

if access to the one or more services available on the network server is granted to the workstation because the workstation credentials are in compliance with the workstation policy, issuing a request for credentials associated with a user; receiving credentials associated with a user; and authenticating a user of the workstation for access to the network server after said authenticating the workstation for access to the network server by determining if the user is authorized to access the one or more services available on the network server through evaluating the credentials associated with the user; and if the workstation credentials do not match the workstation security policy, then denying access to the one or more network services.

2. The computer-implemented process of claim 1 further comprising the step of presenting the workstation credentials to the user of the workstation.

3. The computer-implemented process of claim 1 further comprising the step of transmitting the workstation credentials to the network server via the computer network.

4. The computer-implemented process of claim 1 wherein the scanner comprises a plug-in control operable with the browser and a data file defining security vulnerabilities.

5. The computer-implemented process of claim 1, wherein the step of issuing a request for a scanner comprises the browser issuing a request for a Web page at the network server, the Web page hosting the scanner as a plug-in control available for installation with the browser.

6. A computer-readable medium comprising the computer-implemented process of claim 1.

7. The computer-implemented process of claim 1, further comprising receiving credentials associated with a user from the browser.

8. A computer-implemented process for authenticating a workstation requesting a software service, comprising the steps:

issuing a request for a scanner to a network server from a browser operating on the workstation;

transmitting the scanner and a workstation policy from the network server to the workstation via the computer network, the scanner installable within the browser and operative to generate workstation credentials by completing a vulnerability assessment of the workstation, the workstation credentials comprising at least one of information about integrity of the workstation and a security posture of the workstation;

completing a repair operation by the scanner to address a security vulnerability identified by the scanner in response to completing the vulnerability assessment of the workstation;

comparing the workstation credentials to the workstation policy on the workstation to determine whether the workstation should be granted access to the software service;

authenticating a workstation for access to the software service by granting the workstation access to the software service available on the network server if the workstation credentials derived from the scanner are in compliance with the workstation policy; and if access to the software service is granted to the workstation because the workstation credentials are in compliance with the workstation policy, authenticating a user of the workstation for access to the software service after said authenticating the workstation for access to the software service by issuing a request for user authentication in order to determine if a user of the workstation is authorized to access the software service available on the network server; and if the workstation credentials do not match the workstation security policy, then denying access to the software service.

9. The computer-implemented process of claim 8, wherein the step of issuing a request for a scanner comprises the browser issuing a request for a Web page at the network server, the Web page hosting the scanner as a control operable with the browser.

10. A computer-readable medium comprising the process of claim 8.

11. The computer-implemented process of claim 8, further comprising receiving credentials associated with a user from the browser.

12. The computer-implemented process of claim 11, further comprising authenticating the user based on the credentials.

13. A computer-implemented process for authenticating a workstation requesting a network service from a network server via a computer network, comprising the steps:

issuing a request for a scanner to the network server from a browser operating on the workstation;

transmitting the scanner from the network server to the workstation via the computer network, the scanner installable within the browser and operative to generate workstation credentials by completing a vulnerability assessment of the workstation to identify security vulnerabilities that would compromise the secure operation of the workstation on the computer network, the workstation credentials comprising at least one of information about integrity of the workstation and a security posture of the workstation;

completing a repair operation by the scanner to address a security vulnerability identified by the scanner in response to completing the vulnerability assessment of the workstation;

transmitting the workstation security credentials from the scanner to the network server via the computer network;

determining at the network server whether the workstation should be granted access to a network service of the network based on the workstation credentials;

authenticating a workstation for access to the network service by granting the workstation access to the network service if the workstation credentials derived from the scanner are in compliance with the workstation policy; and if access is granted to the workstation for the network service because the workstation credentials are in compliance with the workstation policy, authenticating a user of the workstation for access to the network service after said authenticating the workstation for access to the network service by issuing a request for information relating to user authentication in order to determine if the user is authorized to access the network service; and if the workstation credentials do not match the workstation security policy, then denying access to the network service.

14. The computer-implemented process recited by claim 13 wherein the network server comprises a CGI script and the step of determining whether the workstation should be granted access to the network service comprises the CGI script comparing the workstation credentials to a workstation security policy maintained at the network server to determine whether the workstation should be granted access to the network service;

wherein granting the workstation access to the network service comprises directing the browser to the log-in page via the computer network;

if the workstation credentials do not match the workstation security policy, then denying access to the network service and delivering an access denied page to the workstation via the computer network.

15. A computer-readable medium comprising the computer-implemented process of claim 13.

16. The computer-implemented process of claim 13, wherein the step of issuing a request for a scanner comprises the browser issuing a request for a Web page at the network server, the Web page hosting the scanner as a plug-in control available for installation with the browser.

17. The computer-implemented process of claim 13, further comprising receiving credentials associated with a user from the browser.

18. The computer-implemented process of claim 17, further comprising authenticating the user based on the credentials.

* * * * *